United States Patent
Yeh et al.

(10) Patent No.: US 10,234,977 B2
(45) Date of Patent: Mar. 19, 2019

(54) PRESSURE SENSING TOUCH DEVICE (71) Applicant: eGalax_eMPIA Technology Inc., Taipei (TW)

(72) Inventors: Shang-Tai Yeh, Taipei (TW); Hsiao-Tsung Lee, Taipei (TW)

(73) Assignee: EGALAX_EMPIA TECHNOLOGY INC., Taipei (TW)

(*) Notice: Subject to any disclaimer, the term of this patent is extended or adjusted under 35 U.S.C. 154(b) by 0 days.

(21) Appl. No.: 15/841,900

(22) Filed: Dec. 14, 2017

(65) Prior Publication Data
US 2018/0364851 A1 Dec. 20, 2018

(30) Foreign Application Priority Data
Jun. 15, 2017 (TW) .............................. 106120010 A (51) Int. Cl.
G06F 3/041 (2006.01)
G06F 3/044 (2006.01)
G06F 3/0488 (2013.01)

(52) U.S. Cl.
CPC ............ *G06F 3/0414* (2013.01); *G06F 3/044* (2013.01); *G06F 3/0416* (2013.01); *G06F 3/0488* (2013.01); *G06F 2203/04112* (2013.01); *G09G 2310/0264* (2013.01)

(58) Field of Classification Search
CPC ...... G06F 3/0414; G06F 3/0488; G06F 3/044; G06F 3/0416; G06F 2203/04112; G09G 2310/0264
See application file for complete search history.

(56) References Cited

U.S. PATENT DOCUMENTS

| 2014/0062934 | A1* | 3/2014 | Coulson | G06F 3/044 345/174 |
| 2017/0160854 | A1* | 6/2017 | Huang | G06F 3/0414 |
| 2017/0308240 | A1* | 10/2017 | Yeh | G06F 3/044 |
| 2018/0059823 | A1* | 3/2018 | Chang | G06F 3/044 |

* cited by examiner

Primary Examiner — Abhishek Sarma
(74) Attorney, Agent, or Firm — Muncy, Geissler, Olds & Lowe, P.C.

(57) ABSTRACT

A pressure sensing touch device includes a control unit, and a pressure-sensing touch panel including a substrate, a first sensing layer, a first insulating layer, a driver layer, a second insulating layer and a second sensing layer; the first sensing layer, the driver layer and the second sensing layer electrically connected to the control unit for detecting the touch location of an external object and the pressure according to changes of capacitive coupling respectively between the first sensing layer and the driver layer and between the driver layer and the second sensing electrode. The deformation amount of the second insulating layer is greater than that of the first insulating layer when receiving a pressure, making closer distance between the driver layer and the second sensing layer and significant change of the capacitive coupling, for accurately detecting the pressure applied by the external object to the pressure-sensing touch panel.

14 Claims, 10 Drawing Sheets

PRESSURE SENSING TOUCH DEVICE

This application claims the priority benefit of Taiwan patent application number 106120010, filed on Jun. 15, 2017.

BACKGROUND OF THE INVENTION

1. Field of the Invention

The present invention relates to touch control technology and more particularly, to a pressure sensing touch device in which the control unit detects the touch location of an external object according to a change in the capacitive coupling between a first sensing layer and a driver layer and the pressure at the touch location according to a change in the capacitive coupling between the driver layer and a second sensing electrode.

2. Description of the Related Art

A touch panel can be joined with a display screen to create a touch screen. Touch screen has been widely used in electronic apparatuses as an input interface for detecting touch input within a display area. Commercial touch screens include are classified into the capacitive type, the resistive type and the optical type according to their touch technologies. A touch panel generally comprises a sensing layer consisting of a plurality of first electrodes and second electrodes, and a control unit comprising a driver and sensor circuit assembly electrically coupled with the first electrodes and second electrodes of the sensing layer and a processor for controlling the driver and sensor circuit assembly to produce a sensing data indicative of the location of the touch point. When operating the touch panel, an electrical field is generated at each intersected point between one first electrode and one respective second electrode. When a finger, stylus or other conducting object approaches or touches the touch panel, it blocks a part of the electrical field, causing a change in the capacitive coupling between the first electrode and the respective second electrode, and the sensing data thus obtained can be used for judging the location of the touched point for executing the related operating mode.

The touch panels of commercial touch screens can detect a change in physical quantity, such as capacitance value upon approaching of an external object or touching of the external object on the touch panel, and then calculate such a physical quantity change to determine the location of the touch point of the external object, and then provide a signal indicative of the touched location to an electronic apparatus (such as notebook computer, tablet computer or smart phone for executing related operation and function to substitute for conventional keyboard input. However, most conventional touch panels can simply detect the location of the touch point, limiting the overall function. Since the sensing data detected by the touch panel can also be used to calculate the pressure exerted on the touch panel by an external object, such as a finger or soft material, the greater the pressure on the touch panel, the larger the touch area on the control panel and the greater the amount of change in mutual capacitive coupling will be. The pressure value can be calculated by detecting the increase of the contact area of the external object and the amount of mutual capacitive coupling. The pressure value thus calculated can be provided to an electronic apparatus for a new function. However, the method of calculating the pressure value according to the change in the touch area of the external object on the touch panel and the relative change in the capacitive coupling is less accurate because the change in the size of touch area of the external object on the touch panel is not accurately indicative of the change in the capacitive coupling, affecting accurate calculation of the pressure value and leading to touch device misjudgment and implementation of a wrong action. Thus, conventional touch devices are difficult to meet the feasibility and practical requirements Therefore, it is desirable to provide a touch device, which solves the problem of inaccurate pressure detection.

SUMMARY OF THE INVENTION

The present invention has been accomplished under the circumstances in view. It is therefore the main object of the present invention to provide a pressure sensing touch device, which accurately detects the touch location of an external object on the touch panel and the pressure applied by the external object to the touch panel.

To achieve this and other objects of the present invention, a pressure sensing touch device comprises a control unit and a pressure-sensing touch panel. The pressure-sensing touch panel comprises a substrate, a first sensing layer, a first insulating layer, a driver layer, a second insulating layer and a second sensing layer properly arranged in a stack with the first sensing layer, the driver layer and the second sensing layer respectively electrically connected to the control unit. Thus, the control unit is capable of detecting the touch location of an external object at the substrate according to a change in the capacitive coupling between the first sensing layer and the driver layer and the pressure at the touch location according to a change in the capacitive coupling between the driver layer and the second sensing electrode. Further, the amount of deformation of the second insulating layer is greater than the amount of deformation of the first insulating layer when the second insulating layer receives a pressure from the external object, any change in the capacitive coupling between the driver layer and the second sensing electrode can be significantly reacted in response to distance change between the driver layer and the second sensing electrode, and thus the pressure applied by the external object to the pressure-sensing touch panel can be accurately detected.

Preferably, the pressure-sensing touch panel comprises a touch sensing unit and a pressure sensing unit. The touch sensing unit consists of the substrate, the first sensing layer, the first insulating layer and the driver layer. The pressure sensing unit consists of the second insulating layer and the second sensing layer. Thus, the control unit detects a change in the capacitive coupling between the pressure-sensing touch panel and the external object using the touch sensing unit and the pressure sensing unit, so as to calculate the touch location of the external object and the pressure applied by the external object. The control unit provides a signal to the electronic apparatus according to the detected touch location and pressure for implementation of a new function. Since the first sensing layer and the second sensing layer use the driver layer in common, the pressure sensing unit can be integrated into the touch sensing unit, minimizing the thickness of the pressure-sensing touch panel. Minimizing the thickness of the pressure-sensing touch panel can simplify the overall structure of the pressure-sensing touch panel and its cost of assembly and manufacturing.

Preferably, the pressure-sensing touch panel further comprises a pixel displaying unit bonded to a bottom surface of the pressure sensing unit opposite to the touch sensing unit. The pixel displaying unit comprises an array of common electrodes, a liquid crystal layer and an array of pixel electrodes. The layer of common electrodes is arranged in the second sensing layer. The liquid crystal layer is arranged between the common electrode and the pixel electrode. The array of common electrodes and the array of pixel electrodes are respectively electrically connected to the control unit for driving the liquid crystal layer to display. As the array of common electrodes of the pixel displaying unit works as the aforesaid second sensing layer, the pixel displaying unit can be integrated into the pressure sensing unit to provide a display function without further bonding of a display panel, enhancing the application of the pressure sensing touch device.

Other advantages and features of the present invention will be fully understood by reference to the following specification in conjunction with the accompanying drawings, in which like reference signs denote like components of structure.

DETAILED DESCRIPTION OF THE PREFERRED EMBODIMENT

Referring to FIGS. 1-5, a pressure sensing touch device in accordance with a first embodiment of the present invention is shown. The pressure sensing touch device comprises a control unit 10 and a pressure-sensing touch panel 20.

Figure 1:
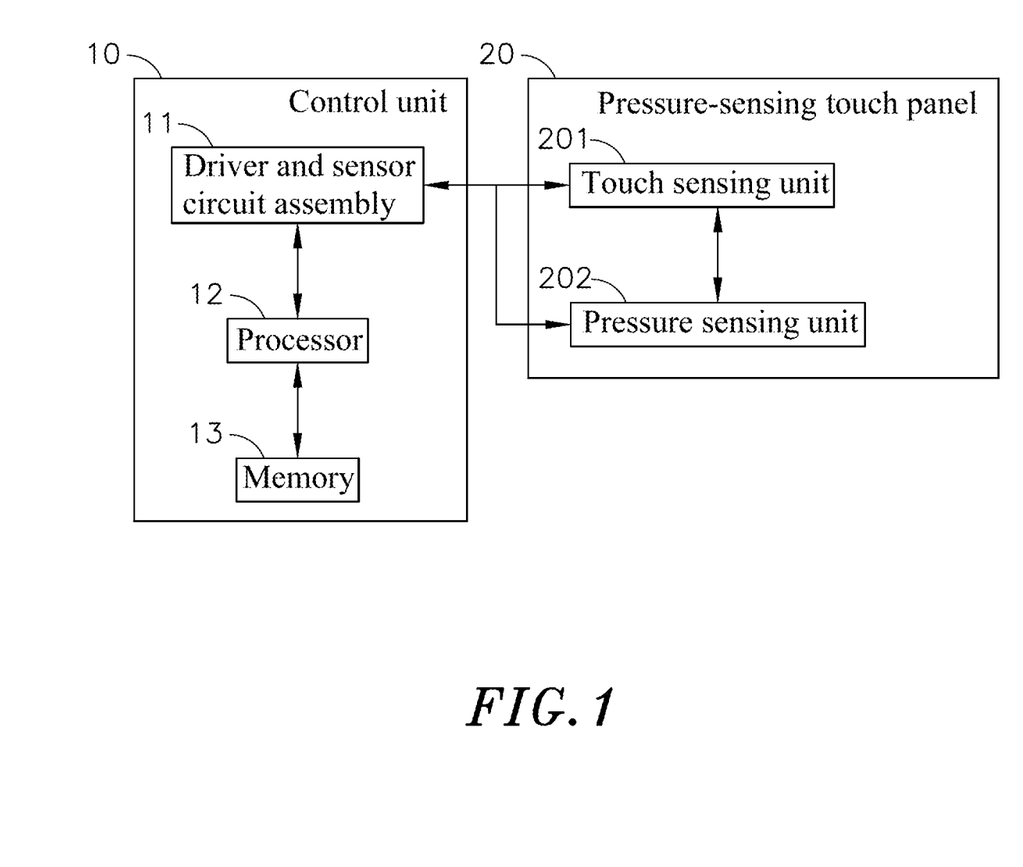
FIG. 1 is a circuit block diagram of a pressure sensing touch device in accordance with the present invention.

The control unit 10 comprises a driver and sensor circuit assembly 11 and a processor 12. The driver and sensor circuit assembly 11 is electrically connected to the pressure-sensing touch panel 20. The processor 12 is electrically connected to the driver and sensor circuit assembly 11 for controlling it to generate sensing data. The control unit 10 further comprises a memory 13 electrically connected to the processor 12 for storing sensing data for the processor 12 to access.

Figure 2:
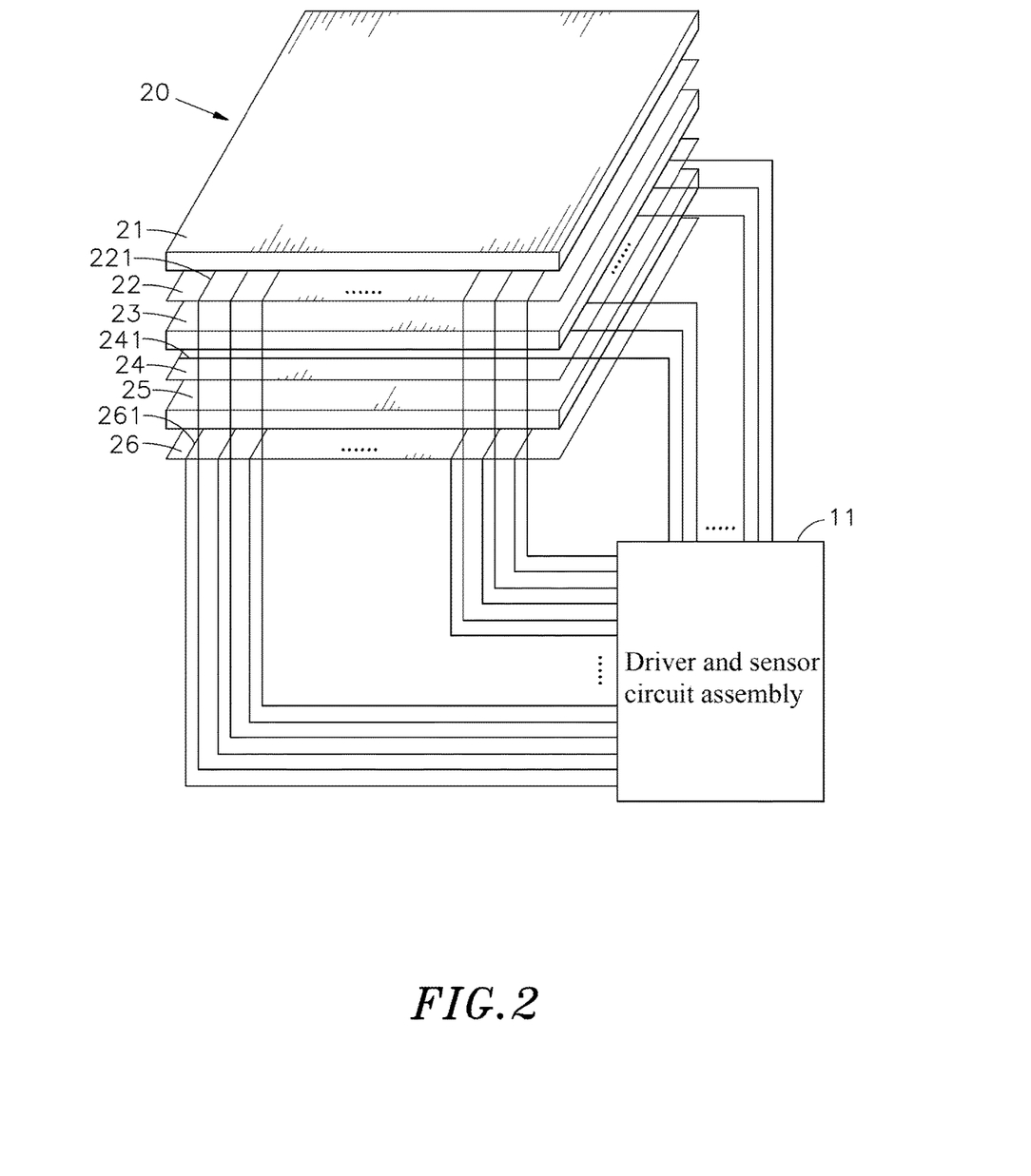
FIG. 2 is an exploded of a pressure sensing touch device in accordance with a first embodiment of the present invention.
Figure 3:
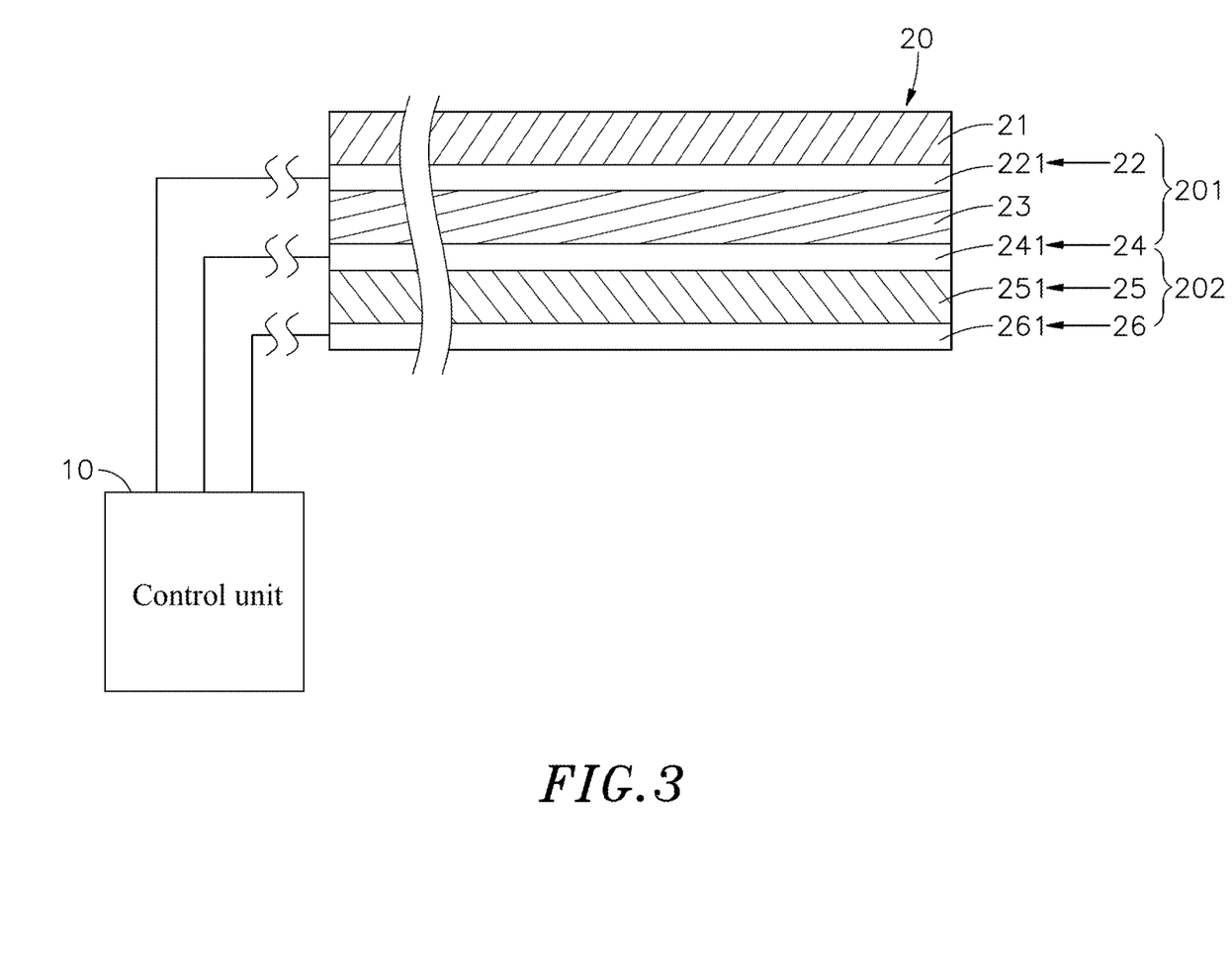
FIG. 3 is a schematic sectional view illustrating the structural arrangement of the pressure-sensing touch panel of the pressure sensing touch device in accordance with the first embodiment of the present invention.

The pressure-sensing touch panel 20 comprises a substrate 21, a first sensing layer 22, a first insulating layer 23, a driver layer 24, a second insulating layer 25 and a second sensing layer 26. The layers are arranged from top to bottom in a proper order in a stack, i.e., The first sensing layer 22 is bonded to a bottom surface of the substrate 21; the first insulating layer 23 is bonded between the first sensing layer 22 and the driver layer 24; the second insulating layer 25 is bonded between the driver layer 24 and the second sensing layer 26. The first sensing layer 22, the driver layer 24 and the second sensing layer 26 are respectively electrically connected to the driver and sensor circuit assembly 11 of the control unit 10. The driver and sensor circuit assembly 11 is operable to provide a driving signal to the driver layer 24 and to receive sensing signals from the first sensing layer 22 and the second sensing layer 26.

The driver layer 24 comprises a plurality of driving electrode 241 arranged in parallel in a first direction (for example, vertical axis direction). The first sensing layer 22 and the second sensing layer 26 respectively comprise a plurality of first sensing electrodes 221 or second sensing electrodes 261 arranged in parallel in a second direction (for example, horizontal axis direction). The first sensing electrodes 221 and the second sensing electrodes 261 are respectively intersected with the driving electrode 241 at two different elevations so that sensing points are defined at respective points of intersection. Thus, the processor 12 can control the driver and sensor circuit assembly 11 to drive the driver layer 24 in outputting a driving signal through the first sensing layer 22 and the second sensing layer 26 for sensing the capacitive coupling at each sensing point so as to further generate a sensing data.

The aforesaid substrate 21 can be a transparent substrate made of glass, plastic or other suitable electrically insulative material. Further, the substrate 21 is flexible. When an external object 30 (such as finger or stylus) presses the surface of the substrate 21, it curves inwardly to a certain extent. Further, the first sensing layer 22, the driver layer 24 and the second sensing layer 26 are transparent conductive films made using lithography technology. The first insulating layer 23 is made of a transparent, flexible organic or inorganic material for electrically isolating the first sensing layer 22 and the driver layer 24. The second insulating layer 25 that is disposed below the first insulating layer 23 is made of a transparent and elastically deformable material. The second insulating layer 25 comprises an integrated elastomer buffer member 251 made of silicone, optical glue, foam and other elastic or compressible material.

Referring to FIGS. 4 and 5 again, when an external object 30 (for example, the user's finger) approaches the first sensing layer 22 of the pressure-sensing touch panel 20, the processor 12 of the control unit 10 controls the driver and sensor circuit assembly 11 to detect a change in a capacitive coupling C1 between the first sensing layer 22 and the driver layer 24 and to further judge the location of the external object 30. At the same time, another capacitive coupling C2 is generated between the driver layer 24 and the second sensing layer 26, however, the driver and sensor circuit assembly 11 detects no significant change in the capacitive coupling C2. When the external object 30 is pressed on the pressure-sensing touch panel 20, due to that the elastic modulus of the second insulating layer 25 is larger than the elastic modulus of the first insulating layer 23, the amount of deformation δ2 per unit area of the second insulating layer 25 is larger than the amount of deformation δ1 of the first insulating layer 23, and thus, there is no significant change in the thickness of the first insulating layer 23, however, a significant change in the thickness of the second insulating layer 25 occurs. The capacitance value change becomes greater as the distance between the driver layer 24 and the second sensing layer 26 becomes shorter, causing a change in the capacitive coupling between the driver layer 24 and the second sensing layer 26 from C2 to C2', thus, there becomes a significant difference between the capacitive coupling C2' that is generated between the driver layer 24 and the second sensing layer 26 and the capacitive coupling C1 that is generated between the first sensing layer 22 and the driver layer 24.

Figure 4:
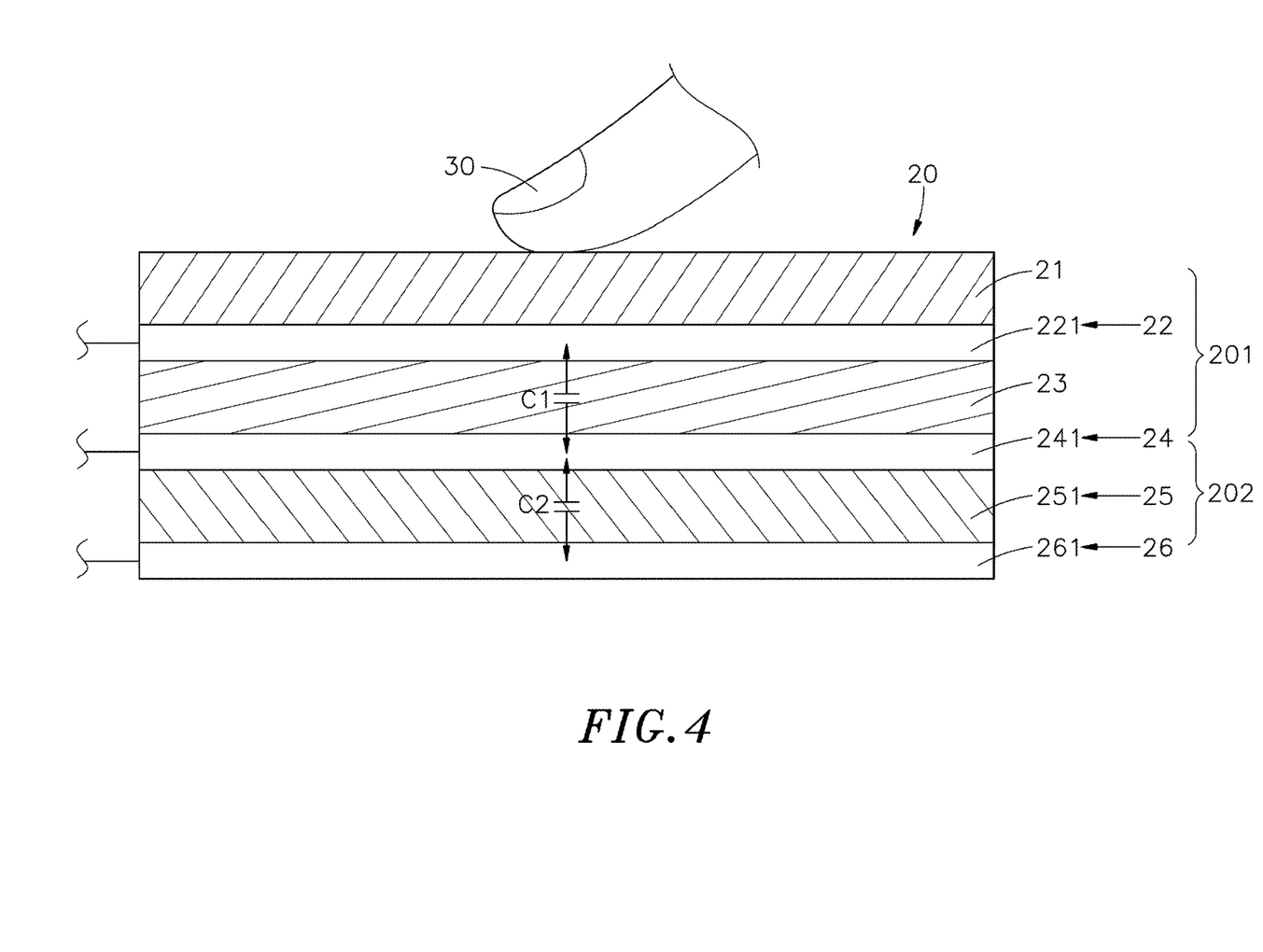
FIG. 4 is a schematic applied view illustrating an external object touched the pressure-sensing touch panel of the pressure sensing touch device in accordance with the first embodiment of the present invention (I).
Figure 5:
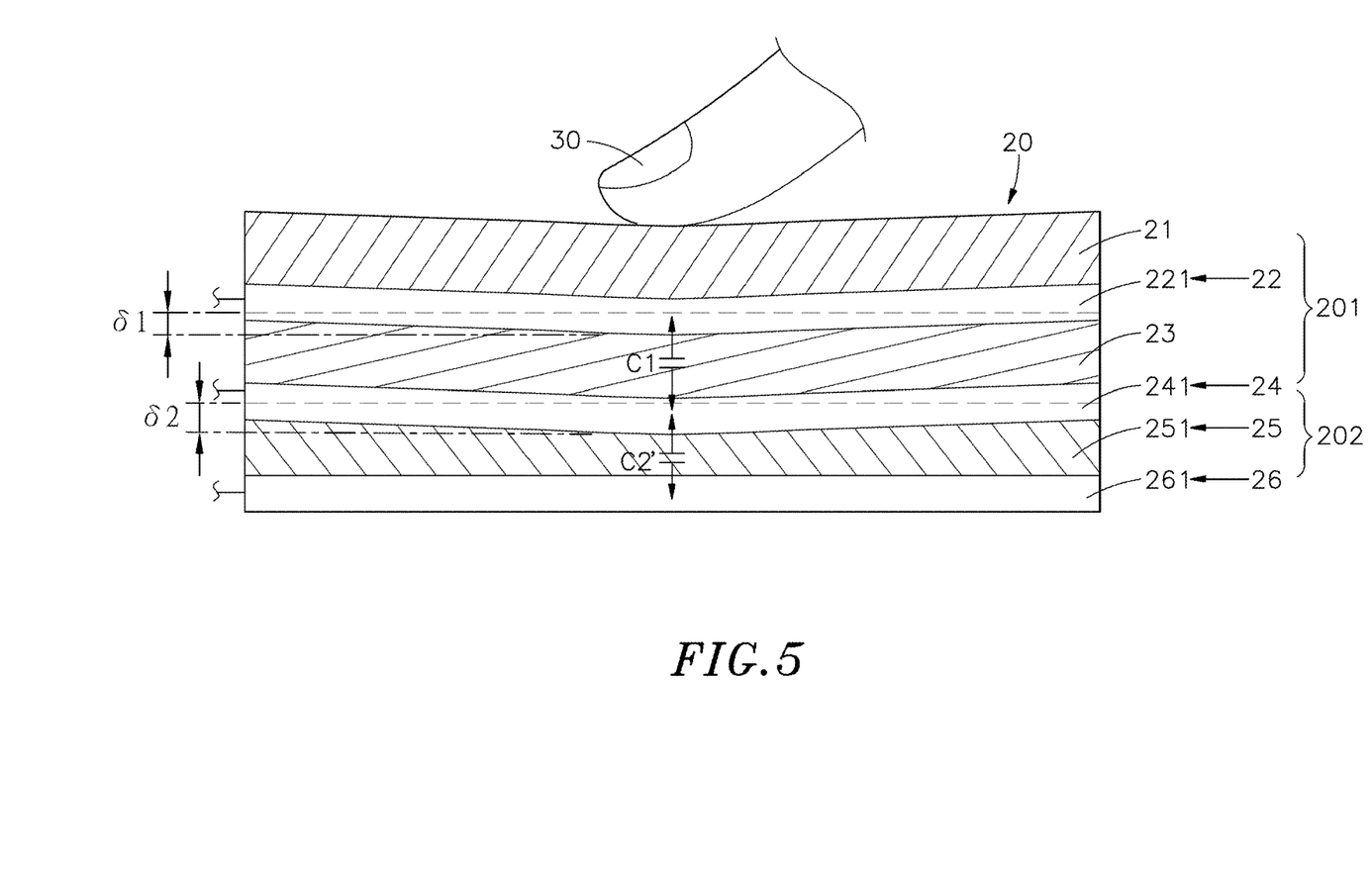
FIG. 5 is a schematic applied view illustrating an external object touched the pressure-sensing touch panel of the pressure sensing touch device in accordance with the first embodiment of the present invention (II).

Thus, the control unit 10 not only can know the touch location of the external object 30 according to the change in the capacitive coupling C1 between the pressure-sensing touch panel 20 and the external object 30, but also can accurately measure the pressure given by the external object 30 to the pressure-sensing touch panel 20 according to the capacitive coupling difference between the capacitive coupling C2 and the capacitive coupling C2'. Subject to the detection of pressure change, the invention can detect the user's hand gesture and touch control mode, such as detecting finger approaching or departing, or tracking the trajectory of the movement of the user's hand. Further, the control unit 10 can simultaneously detect the change in the capacitive coupling C1 between the first sensing layer 22 and the driver layer 24 and the change in the capacitive coupling C2 between the driver layer 24 and the second sensing layer 26, and can also detect the change in the capacitive coupling C1 between the first sensing layer 22 and the driver layer 24 at a first time point and the change in the capacitive coupling C2 between the driver layer 24 and the second sensing layer 26 at a second time point.

Further, the pressure sensing touch device of the present invention is applicable to notebook computers, tablet computers, smart phones and other mobile electronic apparatuses. Except the aforesaid substrate 21, first sensing layer 22, first insulating layer 23, driver layer 24, second insulating layer 25 and second sensing layer 26, the pressure-sensing touch panel 20 further comprises a touch sensing unit 201 and a pressure sensing unit 202. The touch sensing unit 201 consists of the substrate 21, the first sensing layer 22, the first insulating layer 23 and the driver layer 24. The pressure sensing unit 202 consists of the second insulating layer 25 and the second sensing layer 26. Thus, the control unit 10 can use the touch sensing unit 201 and the pressure sensing unit 202 to detect the capacitive couplings C1,C2 between the pressure-sensing touch panel 20 and the external object 30, so as to figure out the touch location of the external object 30 at the pressure-sensing touch panel 20 and the pressure given by the external object 30 at the pressure-sensing touch panel 20, and then to output a corresponding signal indicative of the touch location and applied pressure of the external object 30 to an electronic apparatus instead of a keyboard input (character symbol or instruction input). The pressure sensing function widens the touch control application. The design that the first sensing layer 22 and the second sensing layer 26 use the driver layer 24 in common enables the pressure sensing unit 202 to be integrated into the touch sensing unit 201 so that the pressure sensing touch device not only can detect the touch location, but also can detect the pressure value received by the touch location and minimize the thickness of the pressure-sensing touch panel 20. Minimizing the thickness of the pressure-sensing touch panel 20 simplifies the overall structure of the pressure sensing touch device and reducing its cost of assembly and manufacturing.

Figure 6:
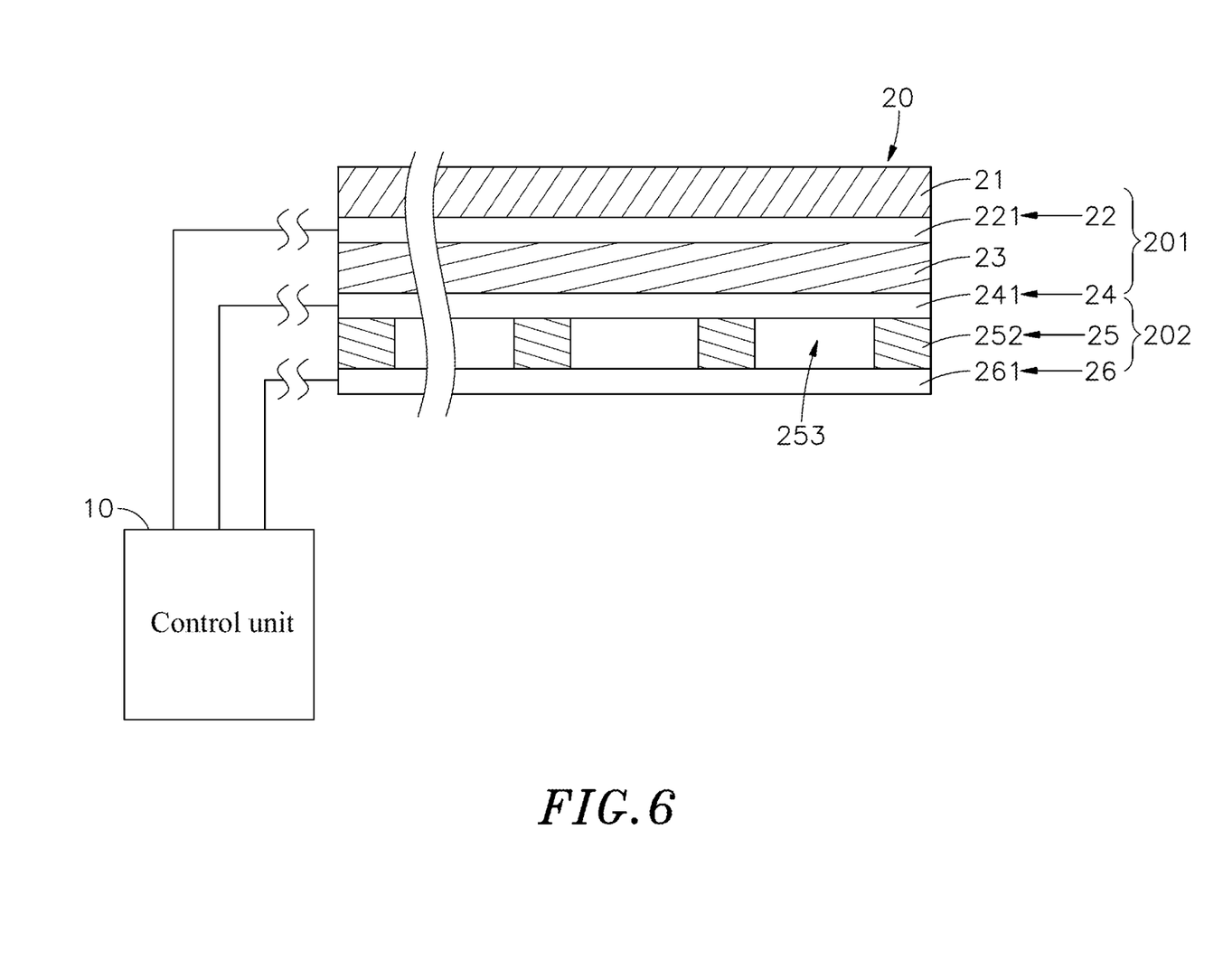
FIG. 6 is a schematic sectional view illustrating the structural arrangement of a pressure sensing touch device in accordance with a second embodiment of the present invention.

Referring to FIG. 6, a pressure sensing touch device in accordance with a second embodiment of the present invention is shown. This second embodiment is substantially similar to the aforesaid first embodiment with the exception of the design of the second insulating layer 25 of the pressure-sensing touch panel 20. According to this second embodiment, the second insulating layer 25 comprises a support structure 252 that can be formed of an array of deformable spacer blocks or a deformable grid-like structure intersected in the first direction (i.e., the vertical axis direction) and the second direction (i.e., the horizontal axis direction), and a plurality of deformable space 253 defined in the support structure 252. The invention allows the second insulating layer 25 to be variously embodied so that the second insulating layer 25 offers a relatively larger flexibility than the first insulating layer 23 and can produce a relatively greater amount of deformation when compressed.

Figure 7:
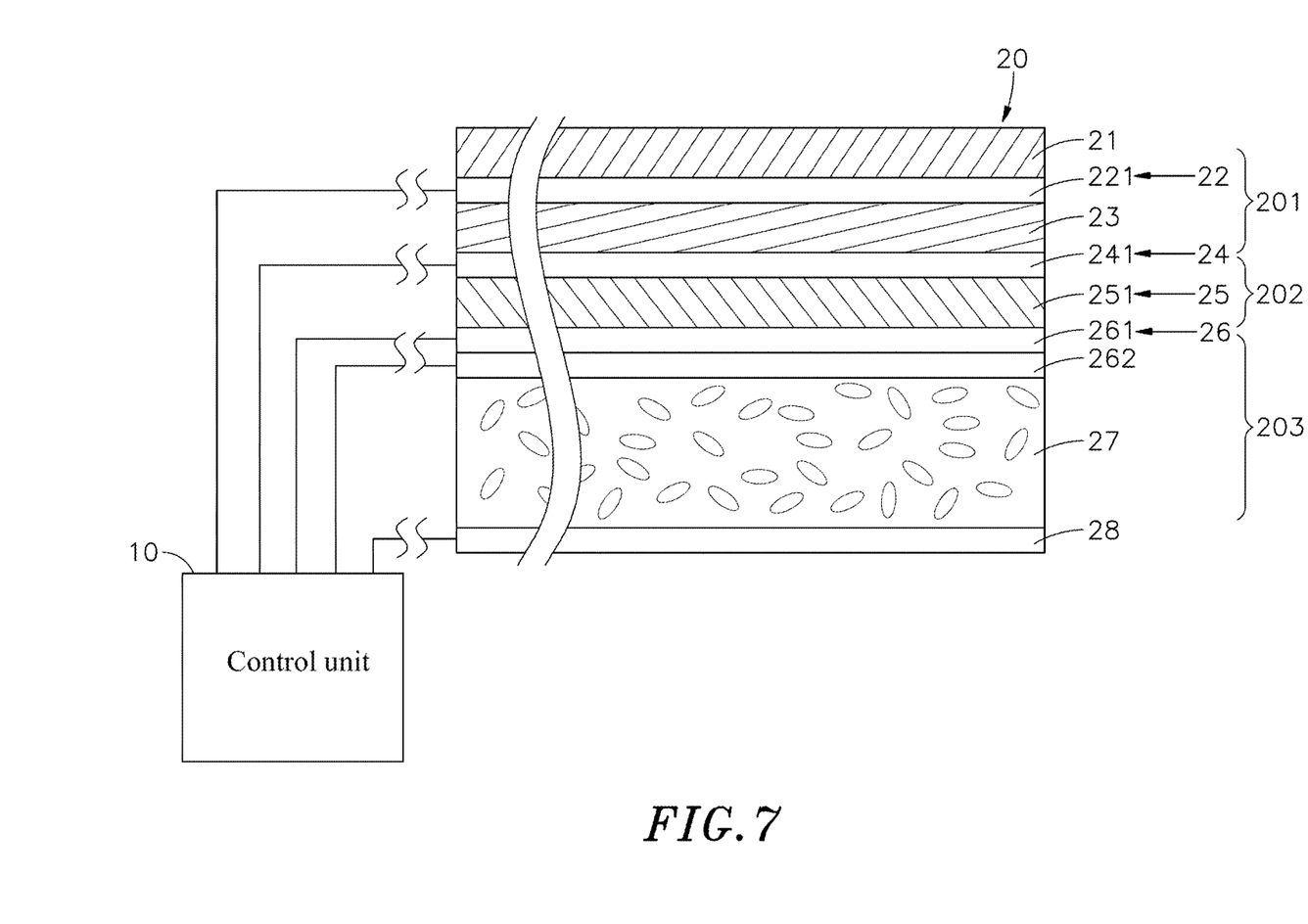
FIG. 7 is a schematic sectional view illustrating the structural arrangement of a pressure sensing touch device in accordance with a third embodiment of the present invention.
Figure 8:
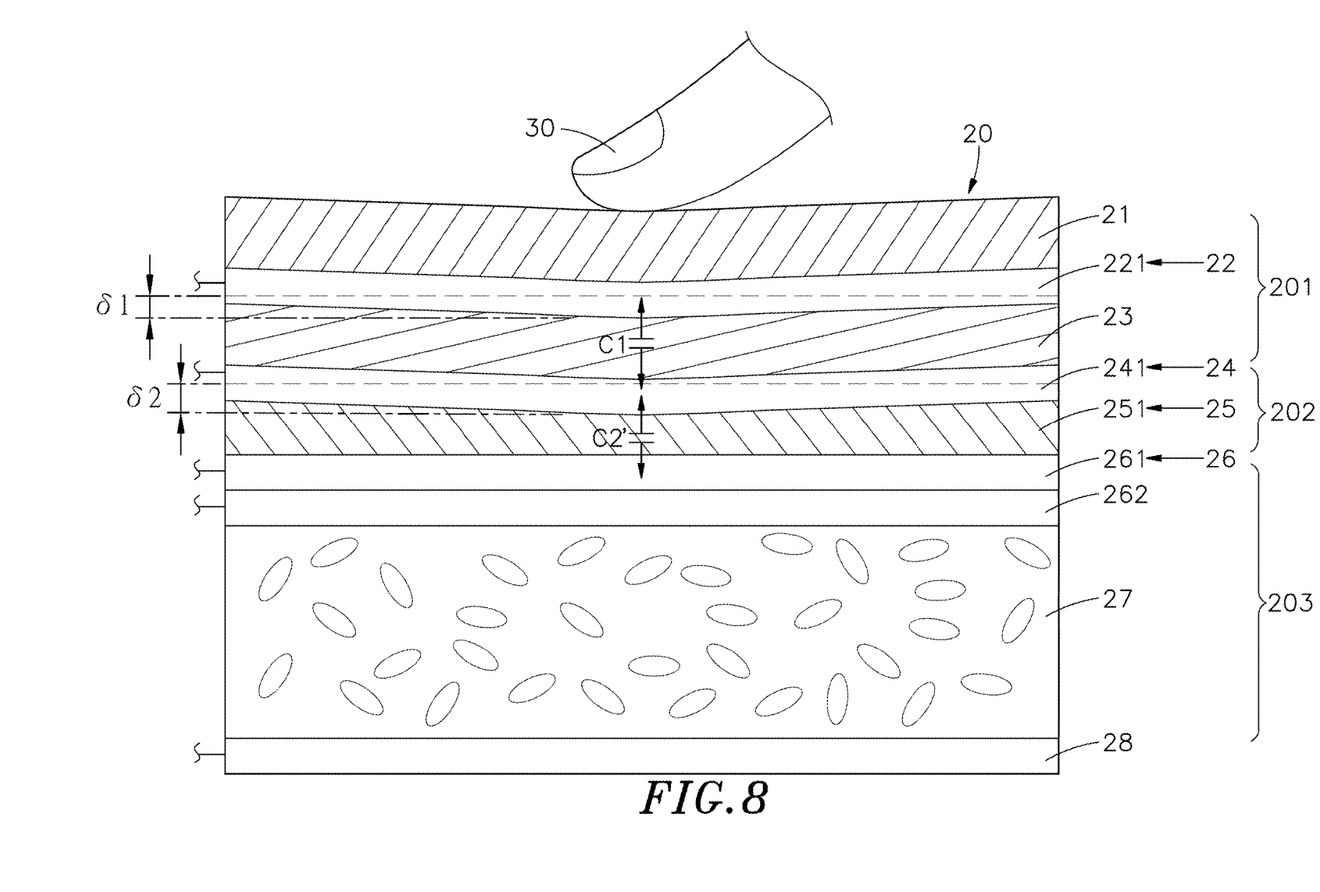
FIG. 8 is a schematic applied view illustrating an external object touched the pressure-sensing touch panel of the pressure sensing touch device in accordance with the third embodiment of the present invention.

Referring to FIGS. 7 and 8, a pressure sensing touch device in accordance with a third embodiment of the present invention is shown. This third embodiment is substantially similar to the aforesaid first embodiment with the exceptions outlined hereinafter. According to this third embodiment, the pressure-sensing touch panel 20 further comprises a pixel displaying unit 203 bonded beneath the touch sensing unit 201 and the pressure sensing unit 202. The pixel displaying unit 203 comprises an array of common electrodes 262, a liquid crystal layer 27 and an array of pixel electrodes 28. The liquid crystal layer 27 is set between the array of common electrodes 262 and the array of pixel electrodes 28. The common electrodes 262 and the pixel electrodes 28 are respectively electrically connected to the driver and sensor circuit assembly 11 of the control unit 10. The array of common electrodes 262 works as the second sensing layer 26 of the aforesaid first embodiment. The second sensing electrodes 261 can be arranged in the array of common electrodes 262, or between the common electrodes 262 and the second insulating layer 25. Thus, the control unit 10 is operable to provide a driving signal to the pixel electrodes 28 and the common electrodes 262, causing the liquid crystal layer 27 to display images.

When an external object 30 (the user's finger or the tip of a stylus) touches the substrate 21, the control unit 10 detects the touch location according to the change in the capacitive coupling C1 between the first sensing layer 22 and the driver layer 24 and the pressure at the touch location according to the change in the capacitive coupling C2' between the driver layer 24 and the second sensing electrode 261, and use the array of common electrodes 262 of the pixel displaying unit 203 as the aforesaid second sensing layer 26 for enabling the pixel displaying unit 203 to be integrated into the pressure sensing unit 202 for image display without further bonding of a display panel, enhancing the application of the pressure sensing touch device and saving the cost of the end product components.

Figure 9:
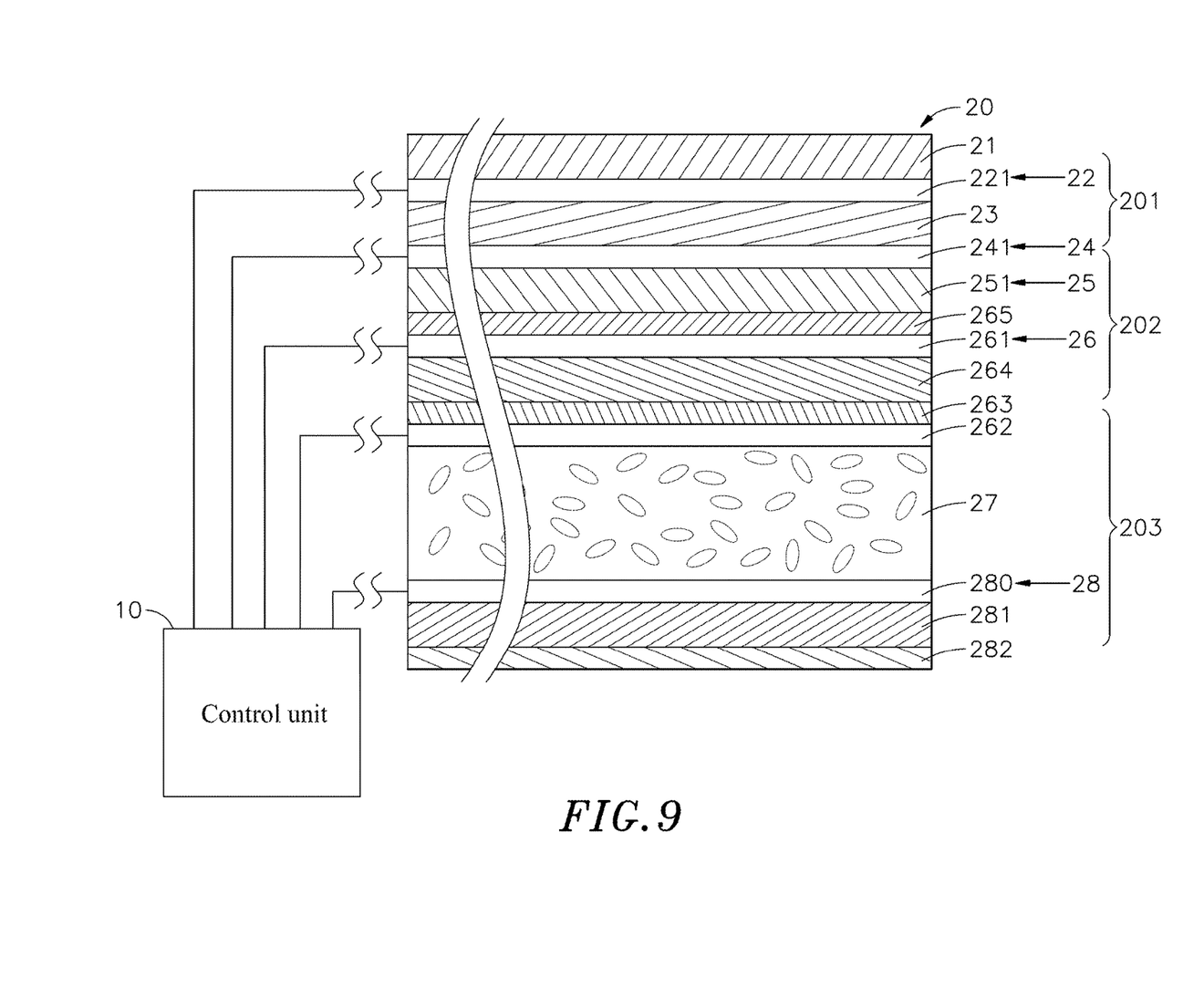
FIG. 9 is a schematic sectional view illustrating the structural arrangement of a pressure sensing touch device in accordance with a fourth embodiment of the present invention.

Referring to FIG. 9, a pressure sensing touch device in accordance with a fourth embodiment of the present invention is shown. This fourth embodiment is substantially similar to the aforesaid third embodiment with the exceptions outlined hereinafter. As illustrated, the second sensing layer 26 in accordance with this fourth embodiment further comprises a shading layer 263, an upper substrate 264 and a first polarizing layer 265. The shading layer 263 is bonded to a top surface of the array of common electrodes 262. On an opposing top surface of the shading layer 263 there are arranged in a proper order the upper substrate 264, the second sensing electrodes 261 and the first polarizing layer 265. Further, the shading layer 263 comprises a color filter. The array of pixel electrodes 28 is embedded in thin film transistor layer 280. On a bottom surface of the thin film transistor layer 280, there are arranged in a proper order a lower substrate 281 and a second polarizing layer 282. The upper substrate 264 and the lower substrate 281 are electrically insulative transparent substrates. The lower substrate 281 can be Thin Film Transistor (TFT) glass substrate. When the thin film transistor layer 280 performs the update scanning of the pixel displaying unit 203 to display the screen frequency, it can give electromagnetic interference (EMI) to the second sensing electrodes 261 of the second sensing layer 26 to affect the detection results of the mutual capacitive coupling. This problem is eliminated by means of coupling the array of common electrodes 262 to a Direct Current (DC) potential shielding area. The array of common electrodes 262 is set between the thin film transistor layer 280 and the second sensing electrodes 261 to eliminate electromagnetic interference during scanning of the thin film transistor layer 280. By means of arranging the second sensing electrode 261 between the upper substrate 264 and the first polarizing layer 265, the upper substrate 264 protects the second sensing electrode 261 against the shielding effect of the common electrode 262.

Figure 10:
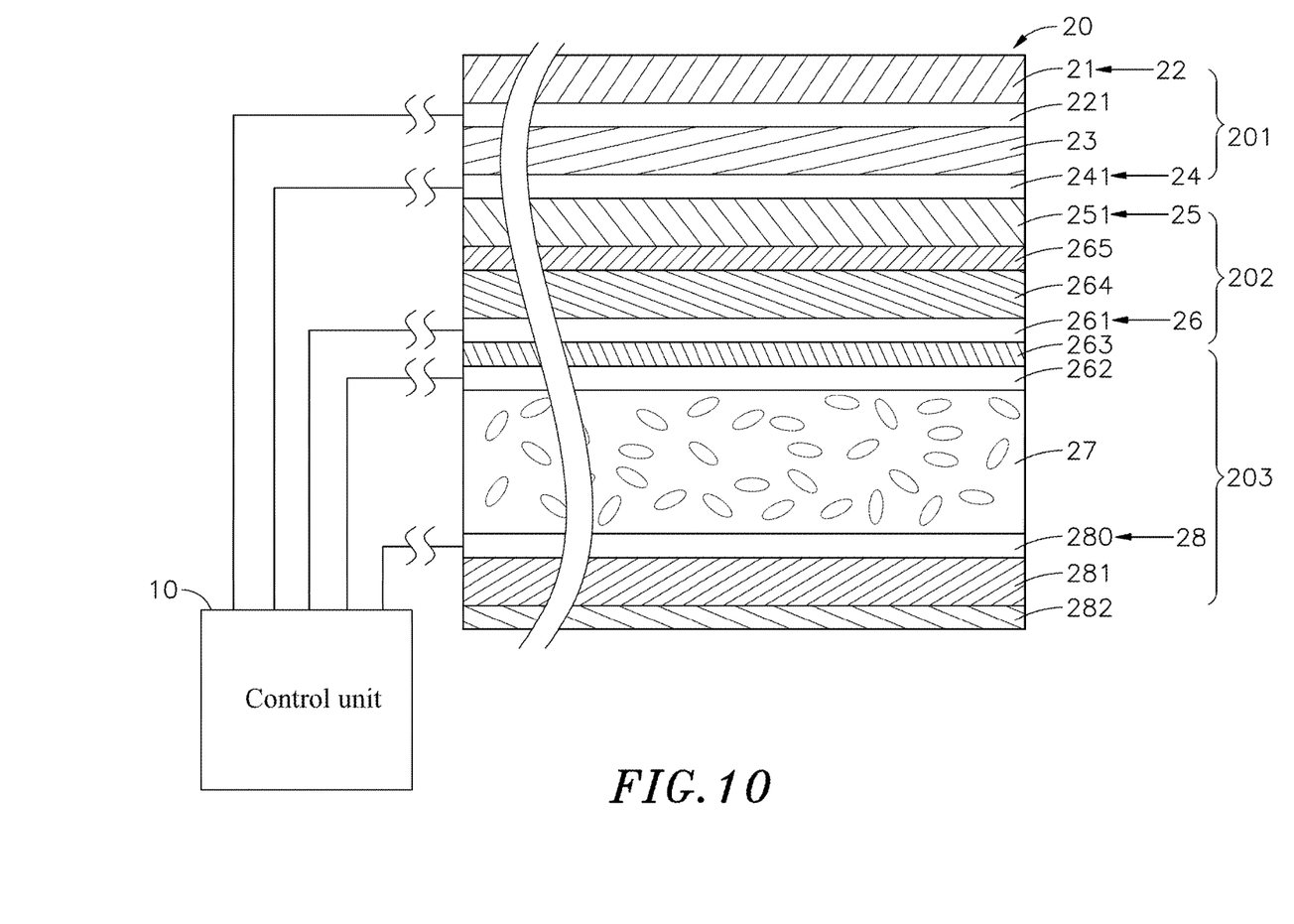
FIG. 10 is a schematic sectional view illustrating the structural arrangement of a pressure sensing touch device in accordance with a fifth embodiment of the present invention.

Referring to FIG. 10, a pressure sensing touch device in accordance with a fifth embodiment of the present invention is shown. This fifth embodiment is substantially similar to the aforesaid fourth embodiment with the exception of the arrangement of the position of the second sensing electrodes 261. In this fifth embodiment, the second sensing electrodes 261 are set between the shading layer 263 and the upper substrate 264 (see FIG. 10). Alternatively, the second sensing electrodes 261 can be embedded in the shading layer 263, the upper substrate 264 or the first polarizing layer 265 so that the shielding area of the array of common electrodes 262 minimizes electromagnetic interference during scanning of the thin film transistor layer 280.

As described above, the pressure-sensing touch panel 20 consists of the substrate 21, the first sensing layer 22, the first insulating layer 23, the driver layer 24, the second insulating layer 25 and the second sensing layer 26; the first sensing layer 22, the driver layer 24 and the second sensing layer 26 are respectively and electrically connected to the control unit 10. When an external object 30 touches the surface of the substrate 21, the control unit 10 detects the touch location according to the change in the capacitive coupling between the first sensing layer 22 and the driver layer 24 and the amount of pressure at the touch location according to the change in the capacitive coupling between the driver layer 24 and the second sensing electrode 26. Further, since the flexibility of the second insulating layer 25 is larger than the flexibility of the first insulating layer 23, any change in the capacitive coupling between the driver layer 24 and the second sensing electrode 26 can be significantly reacted in response to distance change between the driver layer 24 and the second sensing electrode 26, and thus the pressure applied by the external object 30 to the pressure-sensing touch panel 20 can be accurately detected.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A pressure sensing touch device for detecting the touch location of an external object and the pressure at said touch location, comprising:
a control unit; and
a pressure-sensing touch panel comprising a substrate, a first sensing layer, a first insulating layer, a driver layer, a second insulating layer and a second sensing layer properly arranged in a stack, said first sensing layer, said driver layer and said second sensing layer being respectively electrically connected to said control unit, said control unit detecting the touch location of said external object at said substrate according to a change in the capacitive coupling between said first sensing layer and said driver layer and the pressure at said touch location according to a change in the capacitive coupling between said driver layer and said second sensing electrode, the amount of deformation of said second insulating layer being greater than the amount of deformation of said first insulating layer when said second insulating layer receives said pressure at said touch point.

2. The pressure sensing touch device as claimed in claim 1, wherein said control unit comprises a driver and sensor circuit assembly and a processor, said driver and sensor circuit assembly being electrically connected to said first sensing layer, said driver layer and said second sensing layer, said processor being electrically connected to said driver and sensor circuit assembly and adapted for controlling said driver and sensor circuit assembly to output a driving signal to said driver layer and to receive a respective sensing signal from said first sensing layer and said second sensing layer for detecting the capacitive coupling.

3. The pressure sensing touch device as claimed in claim 2, wherein said driver layer comprises a plurality of driving electrodes arranged in parallel in a first direction; said first sensing layer comprises a plurality of first sensing electrodes arranged in parallel in a second direction and respectively intersected with said driving electrodes to define a plurality of sensing points; said second sensing layer comprises a plurality of second sensing electrodes arranged in parallel in said second direction and respectively intersected with said driving electrodes to define a plurality of sensing points.

4. The pressure sensing touch device as claimed in claim 3, wherein said control unit further comprises a memory electrically connected to said processor for storing the sensing data of the capacitive coupling produced at said sensing points detected by said processor through said driver and sensor circuit assembly.

5. The pressure sensing touch device as claimed in claim 1, wherein said substrate, said first sensing layer, said first insulating layer, said driver layer, said second insulating layer and said second sensing layer are made of transparent materials.

6. The pressure sensing touch device as claimed in claim 1, wherein said first insulating layer is selectively made of a transparent, electrically insulative organic or inorganic material, the elastic modulus of said second insulating layer being greater than the elastic modulus of said first insulating layer so that when said second insulating layer and said first insulating layer receives a pressure from said external object, the amount of deformation of said second insulating layer is larger than the amount of deformation of said first insulating layer.

7. The pressure sensing touch device as claimed in claim 6, wherein said second insulating layer is formed integrally with an elastomer buffer member.

8. The pressure sensing touch device as claimed in claim 6, wherein said second insulating layer comprises a plurality of flexible support structures consisting of a plurality of flexible spacer blocks, and said deformable spaces defined in said support structures.

9. The pressure sensing touch device as claimed in claim 6, wherein said second insulating layer is selectively made of silicon rubber, optical glue or foam material.

10. The pressure sensing touch device as claimed in claim 1, wherein said pressure-sensing touch panel comprises a touch sensing unit and a pressure sensing unit, said touch sensing unit consisting of said substrate, said first sensing layer, said first insulating layer and said driver layer, said pressure sensing unit consisting of said second insulating layer and said second sensing layer, said touch sensing unit and said pressure sensing unit commonly use said driver layer.

11. The pressure sensing touch device as claimed in claim 10, wherein said pressure-sensing touch panel further comprises a pixel displaying unit bonded to a bottom surface of said pressure sensing unit opposite to said touch sensing unit, said pixel displaying unit comprising an array of common electrodes, a liquid crystal layer and an array of pixel electrodes, said layer of common electrodes being arranged in said second sensing layer, said liquid crystal layer being arranged between said common electrode and said pixel electrode, said array of common electrodes and said array of pixel electrodes being respectively electrically connected to said control unit for driving said liquid crystal layer to display.

12. The pressure sensing touch device as claimed in claim 11, wherein said second sensing layer comprises a plurality of second sensing electrodes arranged in parallel and arranged in said array of common electrodes.

13. The pressure sensing touch device as claimed in claim 11, wherein said second sensing layer comprises a plurality of second sensing electrodes arranged in parallel between said common electrode and said second insulating layer.

14. The pressure sensing touch device as claimed in claim 11, wherein said second sensing layer further comprises a shading layer bonded to a top surface of said array of common electrode, an upper substrate bonded to a top surface of said shading layer opposite to said array of common electrodes, and a first polarizing layer arranged at a top side of said upper substrate opposite to said shading layer; said pixel electrode further comprises a thin film transistor layer, a lower substrate arranged at a bottom side of said thin film transistor layer and a second polarizing layer arranged at a bottom side of said lower substrate opposite to said thin film transistor layer.

* * * * *